United States Patent
Fusejima et al.

(10) Patent No.: US 8,516,223 B2
(45) Date of Patent: Aug. 20, 2013

(54) DISPATCHING INSTRUCTION FROM RESERVATION STATION TO VACANT INSTRUCTION QUEUE OF ALTERNATE ARITHMETIC UNIT

(75) Inventors: Atsushi Fusejima, Kawasaki (JP); Yasunobu Akizuki, Kawasaki (JP); Toshio Yoshida, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 477 days.

(21) Appl. No.: 12/801,868

(22) Filed: Jun. 29, 2010

(65) Prior Publication Data

US 2010/0332802 A1   Dec. 30, 2010

(30) Foreign Application Priority Data

Jun. 29, 2009 (JP) ................................. 2009-154374

(51) Int. Cl.
*G06F 9/38* (2006.01)
(52) U.S. Cl.
USPC ......... 712/23; 712/208; 712/219; 712/E9.071
(58) Field of Classification Search
None
See application file for complete search history.

(56) References Cited

U.S. PATENT DOCUMENTS

| | | | |
|---|---|---|---|
| 5,475,824 A * | 12/1995 | Grochowski et al. | 712/206 |
| 5,592,679 A * | 1/1997 | Yung | 712/23 |
| 5,809,323 A * | 9/1998 | Eisen et al. | 712/23 |
| 6,105,128 A * | 8/2000 | Hathaway et al. | 712/215 |
| 6,249,855 B1 | 6/2001 | Farrell et al. | |
| 6,742,111 B2 | 5/2004 | Soni | |
| 2003/0014613 A1 | 1/2003 | Soni | |
| 2008/0040589 A1 | 2/2008 | Sakamoto et al. | |
| 2008/0270749 A1 | 10/2008 | Ozer et al. | |

FOREIGN PATENT DOCUMENTS

JP  2000-105699  4/2000

OTHER PUBLICATIONS

Gurindar S. Sohi et al., "Instruction Issue Logic for High-Performance, Interruptable Pipelined Processors," Proceedings of the Annual International Symposium on Computer Architecture, Pittsburgh, Pennsylvania, Jun. 2-5, 1987, pp. 27-34 plus cover sheet.
Extended European Search Report for corresponding European Application No. 10 16 7671, mailed on Sep. 20, 2010.

\* cited by examiner

*Primary Examiner* — Kenneth Kim
(74) *Attorney, Agent, or Firm* — Staas & Halsey LLP

(57) ABSTRACT

A priority circuit is connected to a reservation station and a plurality of arithmetic units that processes different operations and dispatches, when it is determined that an executable flag indicating that an instruction can be executed by only a specific arithmetic unit is on, an instruction to an arithmetic unit that is different from the specific arithmetic unit and of which a queue is vacant in accordance with the input performed by an instruction decoder and the reservation station.

6 Claims, 12 Drawing Sheets

DISPATCHING INSTRUCTION FROM RESERVATION STATION TO VACANT INSTRUCTION QUEUE OF ALTERNATE ARITHMETIC UNIT

CROSS-REFERENCE TO RELATED APPLICATION

This application is based upon and claims the benefit of priority of the prior Japanese Patent Application No. 2009-154374, filed on Jun. 29, 2009, the entire contents of which are incorporated herein by reference.

FIELD

The embodiments discussed herein are directed to a priority circuit, a processor, and a processing method.

BACKGROUND

Generally, a processor such as CPU (Central Processing Unit) or MPU (Micro Processing Unit) is an arithmetic processing unit that is included in an information processor, a portable telephone, or the like and executes various types of arithmetic processing. In recent years, with the miniaturization of a processor and the improvement of processing performance, the application field of the processor has been various.

Figure 10:
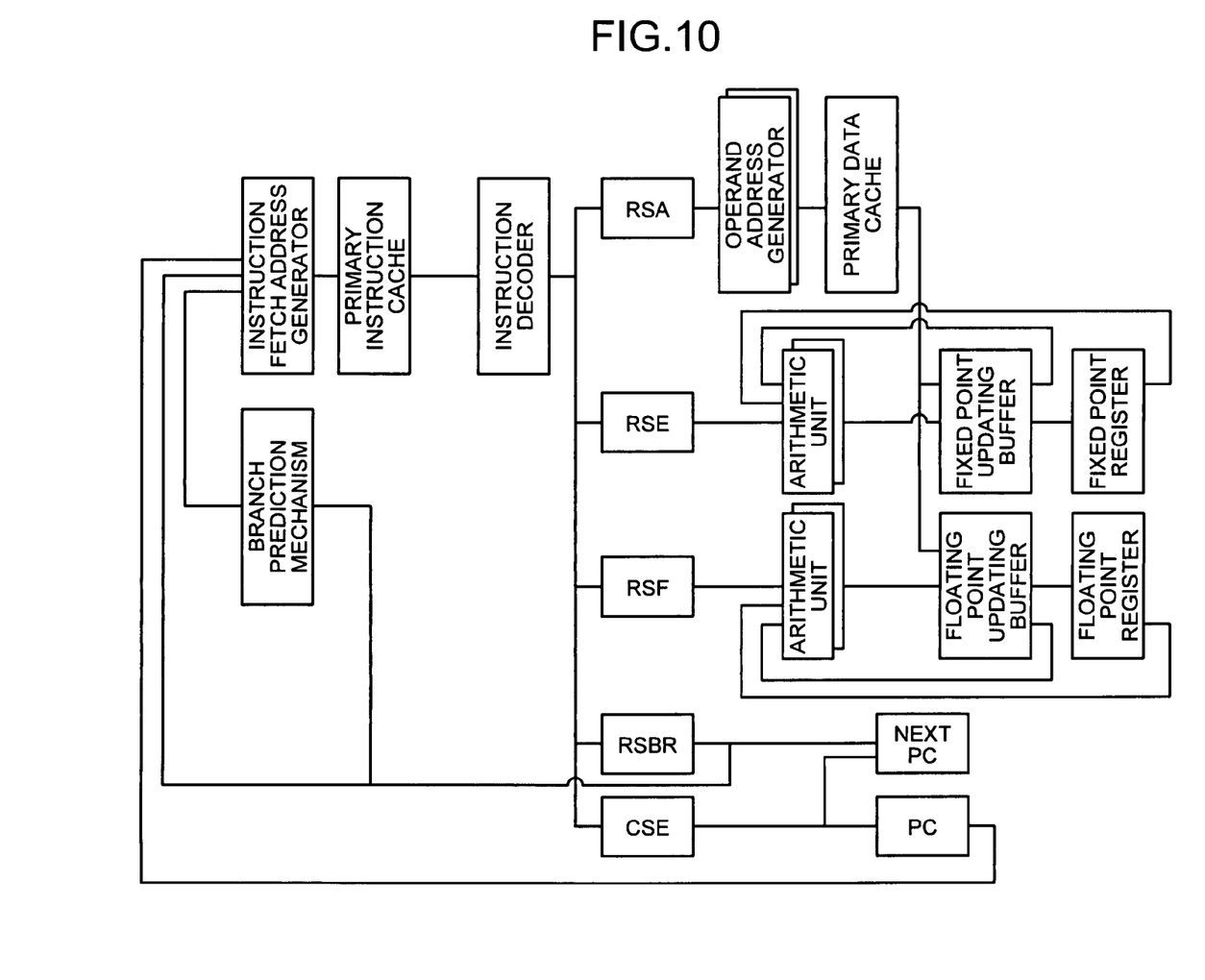
FIG. 10 is a diagram illustrating a configuration example of a processor.
Figure 11:
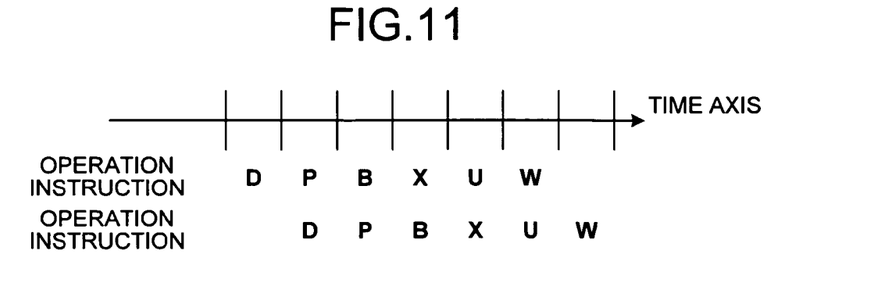
FIG. 11 is a diagram illustrating an example of a pipeline in the processor.

It will be now explained about the configuration of a processor and a pipelining of the processor with reference to FIG. 10 and FIG. 11. FIG. 10 is a diagram illustrating a configuration example of a processor. FIG. 11 is a diagram illustrating an example of a pipelining of the processor.

For example, as illustrated in FIG. 10, the processor sends an instruction from a primary instruction cache to an instruction decoder and decodes the instruction by the instruction decoder in a decode (D) cycle (see FIG. 11). The decode by the instruction decoder is performed on RS (Reservation Station) that functions as an execution queue that stores instructions to be executed and is performed in order (in a program sequence).

For example, RS includes RSA (Reservation Station for Address) for load and store instructions, RSE (Reservation Station for Execution) for fixed point arithmetic instructions (integer arithmetic instructions), RSF (Reservation Station for Floating point) for floating point arithmetic instructions, RSBR (Reservation Station for BRanch) for branch instructions, and the like.

The processor registers all instructions decoded by the instruction decoder in CSE (Commit Stack Entry) that performs the management of all the instructions and registers all the instructions in the reservation stations that perform an out-of-order execution control in such a manner that an executable instruction is executed in first regardless of a program sequence. Next, the processor selects an instruction that can be executed in a priority (P) cycle (see FIG. 11) of each RS in an out-of-order manner.

After that, the processor reads out a register in a buffer (B) cycle (see FIG. 11) and executes arithmetic processing in an instruction execution (X) cycle (see FIG. 11). The execution result by the arithmetic processing is stored in an updating buffer in a register updating (U) cycle (see FIG. 11). After that, the process waits a commit process that is an instruction completion process.

Then, the processor receives reports such as execution completion of arithmetic processing in CSE, completion of data transfer process from a primary data cache, and completion of branch determination process from a branch control mechanism, and performs a commit process in order. Next, the processor writes information from the updating buffer to the register in a register writing (W) cycle (see FIG. 11) and performs updating on PC (Program Counter) and NPC (Next Program Counter) that is the next PC.

Figure 12:
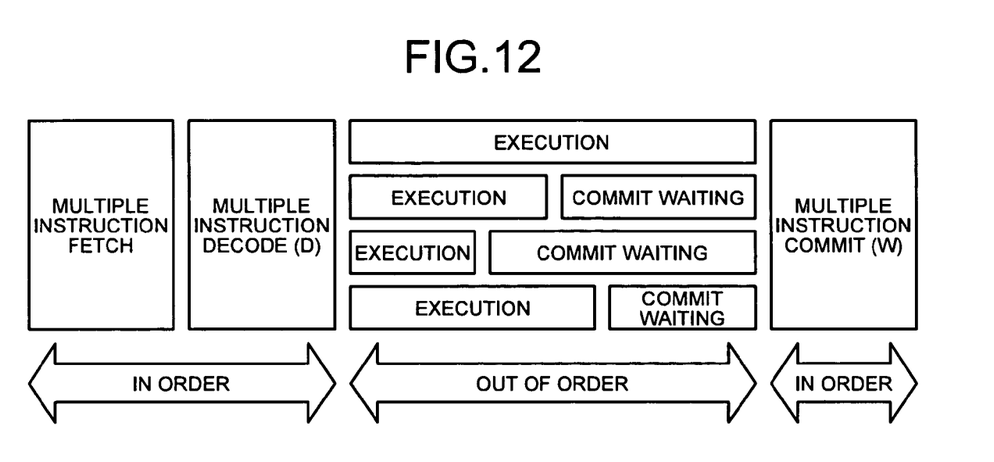
FIG. 12 is a diagram explaining an out-of-order process by a super scalar method.

However, as a technique for improving a resource utilization ratio in a cache, a pipeline, an arithmetic unit, and the like that are required for instruction execution performed by the processor and drawing out the performance of the processor, there is a technology called a super scalar method as illustrated in FIG. 12. FIG. 12 is a diagram explaining an out-of-order process performed by a super scalar method.

For example, as illustrated in FIG. 12, in a super scalar method, when a processor includes a plurality of arithmetic units, the processor includes reservation stations (RSs) corresponding to the respective arithmetic units. The assignment of instructions to the RSs is performed by a decoder. The arithmetic unit executes arithmetic processing that is first entered in each RS and that is dispatched (issued) in accordance with instruction priority of execution preparation completion (oldest ready).

In FIG. 12, the processor includes four arithmetic units that can be simultaneously executed as the maximum number of processing to execute instructions in an out-of-order manner. The processor also performs the fetch, decode, and, commit of a plurality of instructions in order. In other words, in FIG. 12, even if the plurality of arithmetic units preferentially executes instructions that are first entered and are in an execution preparation (oldest ready) state in an out-of-order manner, the processor performs a commit process in order.

Figure 13:
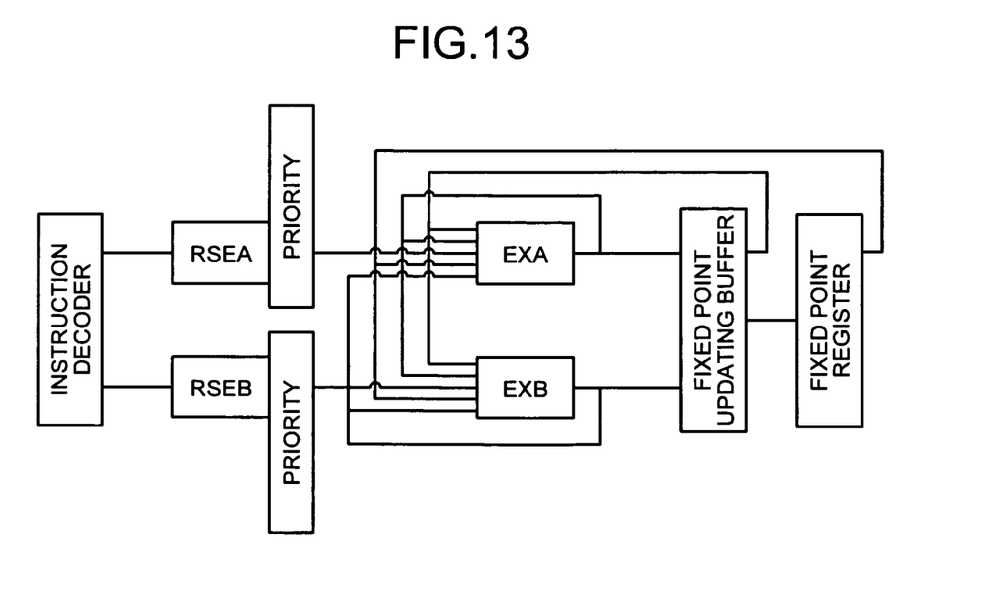
FIG. 13 is a diagram explaining an example of RS that has a plurality of asymmetric fixed point arithmetic units.

Next, it will be explained about RS that has a plurality of dissymmetric fixed point arithmetic units with reference to FIG. 13. FIG. 13 is a diagram explaining an example of RS that has a plurality of asymmetric fixed point arithmetic units. In this case, when an arithmetic unit A and an arithmetic unit B exist together, asymmetry means that operations that can be executed by the arithmetic units A and B are different. As an example of asymmetry, the arithmetic unit A can perform only addition and subtraction and the arithmetic unit B can perform only multiplication and division.

For example, as illustrated in FIG. 13, when a processor includes asymmetric fixed point arithmetic units (EX: EXecution unit) EXA and EXB, the presence of an instruction that can be executed by only the EXA is determined by a decoder and the instruction is registered in the corresponding RSE (RSEA or RSEB) of EXA and EXB. Then, the instruction is dispatched to the EXA or the EXB in accordance with the priority of an instruction for each RSE.

Figure 14:
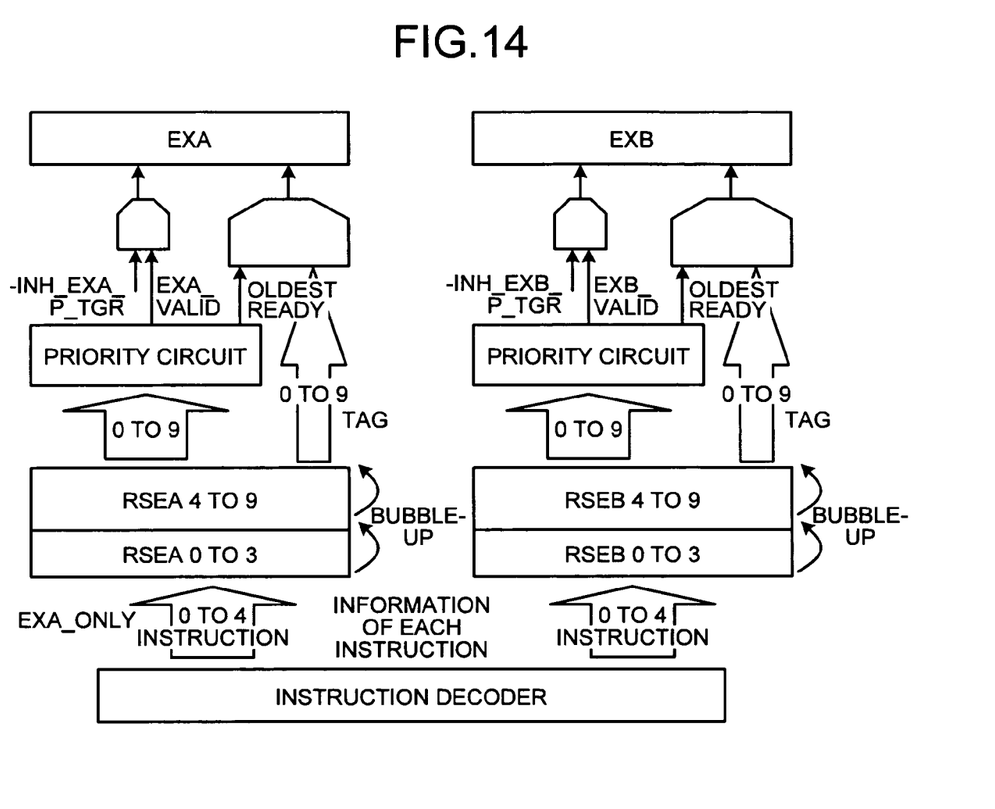
FIG. 14 is a diagram explaining an example of dispatch to an arithmetic unit.

Next, it will be explained about the dispatch to an arithmetic unit with reference to FIG. 14. FIG. 14 is a diagram explaining an example of the dispatch to an operational unit. In FIG. 14, it will be explained about the case where four instructions are simultaneously decoded at a maximum. Moreover, EXA_ONLY in FIG. 14 indicates an instruction that can be executed by only the EXA.

For example, as illustrated in FIG. 14, when four instructions can be simultaneously decoded at a maximum, the decoded instructions are assigned to RSEA or RSEB and the instructions are registered in "0 to 3" that are queues of RSEA or RSEB. At this time, as described above, instructions that can be executed by only the EXA are registered in RSEA.

While the old instruction of the instructions registered in each of queues is moved to the upper number (for example, 4 to 9) every cycle, i.e. a bubble up is performed, a priority circuit selects an oldest-ready instruction from each of RSEA and RSEB. Next, when "+INH_EXA(B)_P_TGR" that is a dispatch inhibition flag for each of the arithmetic units EXA and EXB is not on, the selected instruction is dispatched because "EXA(B)_VALID" of a priority selection signal of the arithmetic unit or that is a priority selection signal of the arithmetic unit becomes valid.

In the configuration illustrated in FIG. 14, the priority circuit after bubble up transmits and receives information such as various types of flags or conditions and resources such as real data and addresses required for operations are transmitted and received by a tag part illustrated at the right side of the priority circuit. In brief, when the dispatch inhibition flag is not on (when the dispatch inhibition flag is "−INH_EXA (B)_P_TGR"), the arithmetic unit EXA or EXB performs arithmetic processing of real data.

Figure 15:
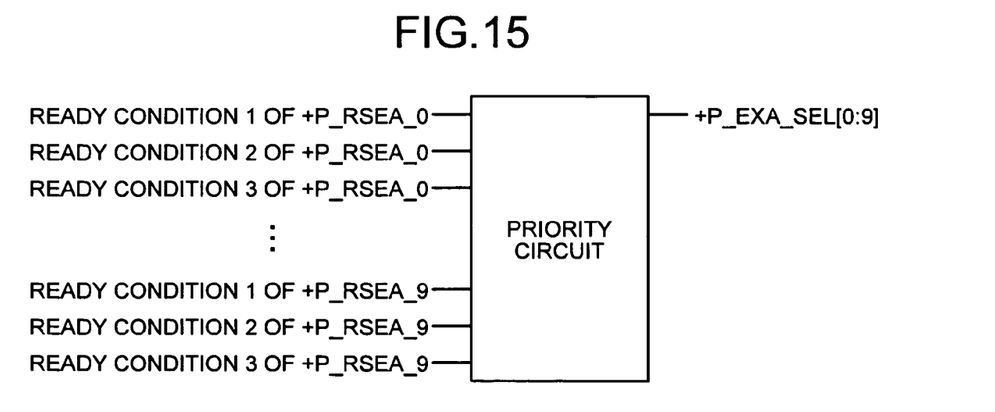
FIG. 15 is a diagram explaining the functional block of a priority circuit of RSEA.

Next, it will be explained about the functional block of the priority circuit of RSEA with reference to FIG. 15. FIG. 15 is a diagram explaining the functional block of the priority circuit of RSEA.

For example, as illustrated in FIG. 15, the priority circuit sets only one bit of a signal "+P_EXA_SEL[0:9]" for selecting an entry to be dispatched to EXA to "1" by using a READY condition of each of nine instructions "+P_RSEA__0" to "+P_RSEA__9" that function as entries as an input condition.

A READY condition of each entry includes, for example, "Condition 1: the entry is valid and is not dispatched", "Condition 2: a source 1 register does not dependency relation or can be bypassed", and "Condition 3: a source 2 register does not dependency relation or can be bypassed".

Figure 16:
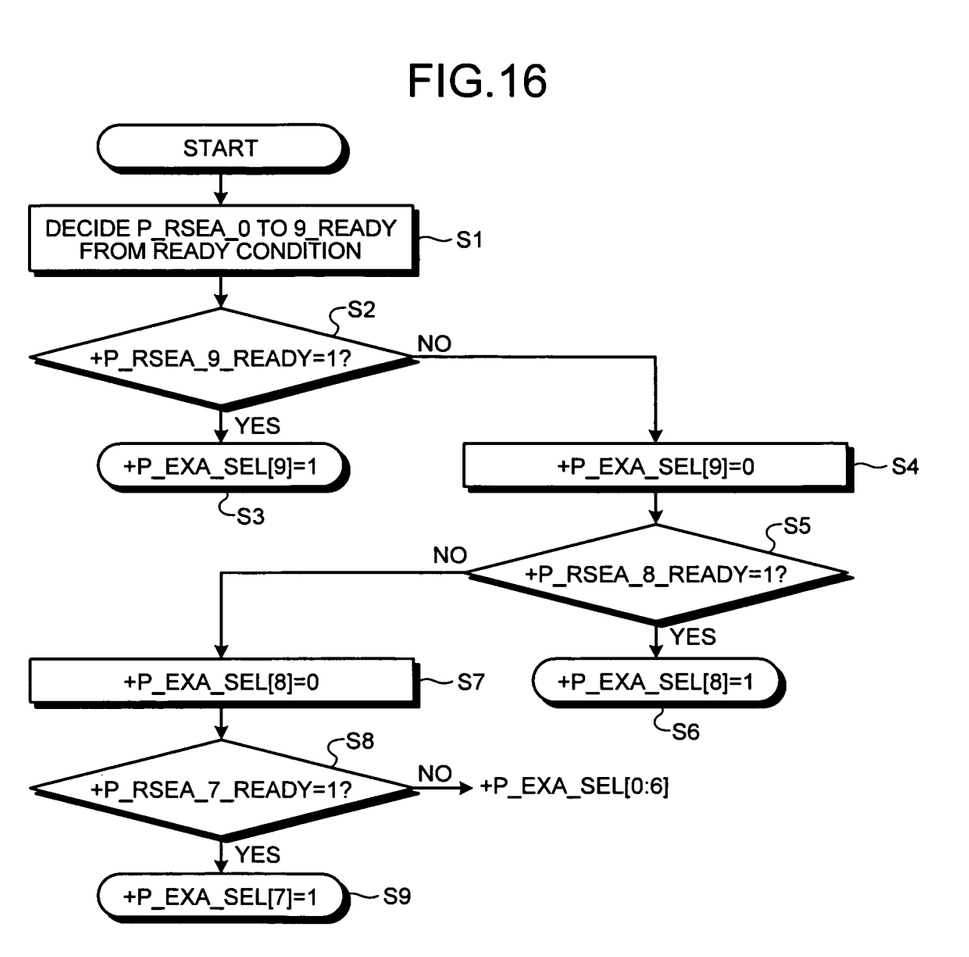
FIG. 16 is a diagram explaining a flow of a process performed by the priority circuit of RSEA.

Next, it will be explained about the flow performed by the priority circuit of RSEA with reference to FIG. 16. FIG. 16 is a diagram explaining the flow performed by the priority circuit of RSEA.

For example, as illustrated in FIG. 16, the priority circuit decides the READY conditions of "P_RSEA__0" to "P_RSEA__9" from READY conditions (Step S1). Then, the priority circuit determines whether Condition 1 to Condition 3 are satisfied as the READY condition of "P_RSEA__9" (Step S2).

Figure 17:
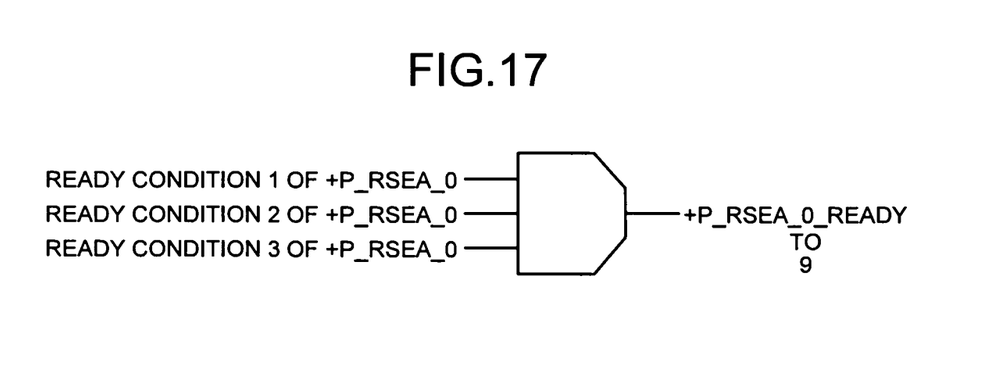
FIG. 17 is a diagram illustrating the details of the priority circuit of RSEA.

Next, when all the three conditions are satisfied (Step S2: YES), the priority circuit selects the queue "9" "+P_EXA_SEL[9]=1" as an instruction to be dispatched to the arithmetic unit EXA (Step S3). In this case, the priority circuit in relation to the input of three conditions determines a queue from an old queue, i.e., the queue "9" among "0 to 9" when Condition 1 to Condition 3 are satisfied as illustrated in FIG. 17. FIG. 17 is a diagram illustrating the details of the priority circuit of RSEA.

Moreover, when the three conditions are not satisfied (Step S2: NO), the priority circuit does not select the queue "9" "+P_EXA_SEL[9]=0" (Step S4). Then, the priority circuit determines whether Condition 1 to Condition 3 are satisfied as the READY condition of "P_RSEA__8" (Step S5). Next, when all the three conditions are satisfied (Step S5: YES), the priority circuit selects the queue "8" "+P_EXA_SEL[8]=1" as an instruction to be dispatched to the arithmetic unit EXA (Step S6).

Moreover, when the three conditions are not satisfied (Step S5: NO), the priority circuit does not select the queue "8" "+P_EXA_SEL[8]=0" (Step S7). Then, the priority circuit determines whether Condition 1 to Condition 3 are satisfied as the READY condition of "P_RSEA__7" (Step S8).

Next, when all the three conditions are satisfied (Step S8: YES), the priority circuit selects the queue "7" "+P_EXA_SEL[7]=1" as an instruction to be dispatched to the arithmetic unit EXA (Step S9). On the other hand, when the three conditions are not satisfied (Step S8: NO), the priority circuit performs the same process on the queues "0 to 6".

Figure 18:
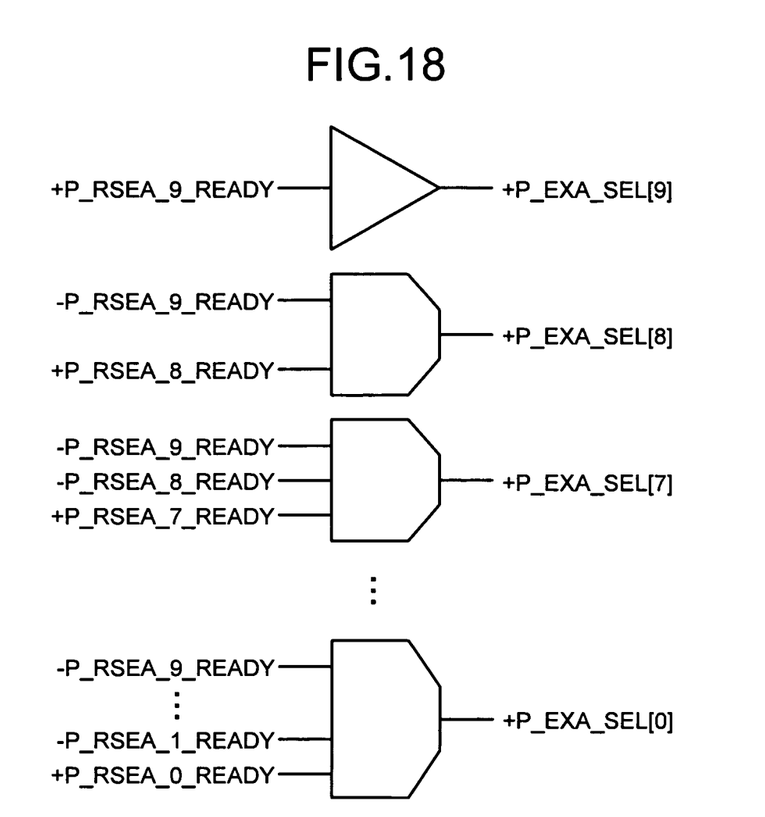
FIG. 18 is a diagram illustrating the details of the priority circuit of RSEA.

According to the flow, as illustrated in FIG. 18, the priority circuit of RSEA selects "9" if it is "+P_RSEA__9_READY", for example. On the other hand, in the "−P_RSEA__9_READY" state where "9" is not selected, the priority circuit selects "8" if it is "+P_RSEA__8_READY".

Moreover, in the case of "−P_RSEA__9_READY", "−P_RSEA__8_READY", and "+P_RSEA__7_READY", the priority circuit selects "7". FIG. 18 is a diagram illustrating the details of the priority circuit of RSEA. Furthermore, dispatch is performed on RSEB by a priority circuit similarly to RSEA.

However, as described above, when each of the fixed point arithmetic units has RSE, a mounting area in a circuit increases. Thus, it is preferable that a processor for executing a floating point arithmetic program for HPC (High Performance Computing) etc. that has a higher load than that of a fixed point arithmetic program effectively utilizes the RSE resource to be a smaller mounting area because it is a few that all the entries of RSE are filled up.

Figure 19:
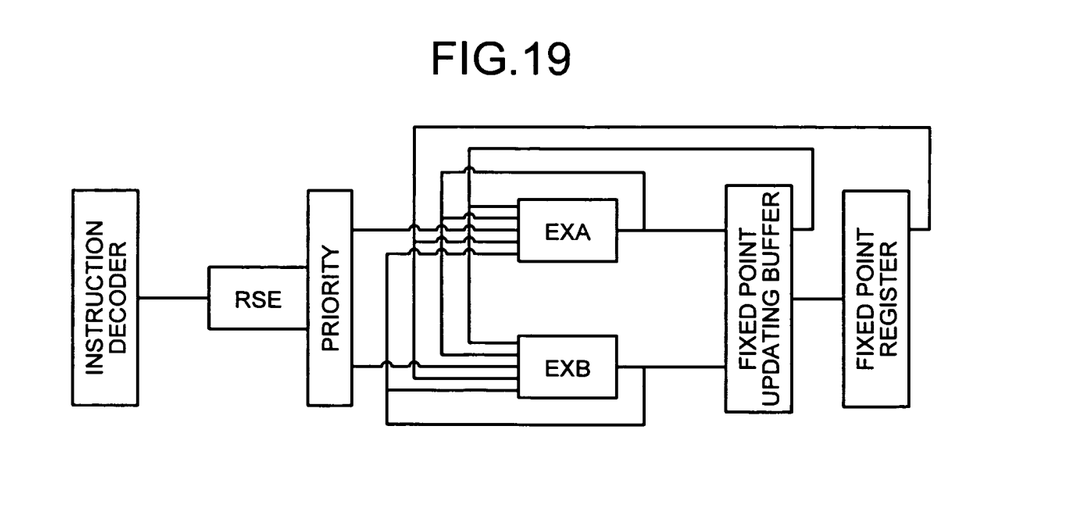
FIG. 19 is a diagram explaining an RSE sharing example.

Therefore, in recent years, as illustrated in FIG. 19, there is a technique for sharing RSE to be a smaller mounting area and registering instructions in one RSE without having RSE for each fixed point arithmetic unit. In this regard, FIG. 19 is a diagram explaining an RSE sharing example.

However, in the technology for sharing RSE described above, there is a problem in that an operation according to an instruction that can be executed by only a predetermined arithmetic unit has errors. Specifically, in the technology for sharing RSE described above, an instruction that cannot be executed by an arithmetic unit is dispatched and thus an operation according to an instruction that can be executed by only a predetermined arithmetic unit has errors because it is not considered that different executable instructions are assigned to arithmetic units.

[Patent Document 1] Japanese Laid-open Patent Publication No. 2000-105699

SUMMARY

According to an aspect of an embodiment of the invention, a priority circuit is connected to a reservation station that holds and supplies a decoded instruction decoded by an instruction decoder to be operated and executable information outputted from the instruction decoder indicating whether a decoded instruction can be executed only by a specific arithmetic unit and a plurality of arithmetic units each have an instruction queue storing the decoded instruction supplied from the reservation station and each execute a different operation based on the decoded instruction stored in the instruction queue. The priority circuit includes dispatching unit that dispatches the decoded instruction to an arithmetic unit different from the specific arithmetic unit when the executable information indicates that the decoded instruction can be executed not only by the specific arithmetic unit and of which an instruction queue is vacant on the basis of the executable information input from the reservation station.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 2B is a diagram explaining an example of dispatch to the arithmetic unit when a dispatch inhibition flag is on;

DESCRIPTION OF EMBODIMENTS

Preferred embodiments of the present invention will be explained with reference to accompanying drawings. The present invention is not limited to the embodiments explained below.

[a] First Embodiment

Figure 1:
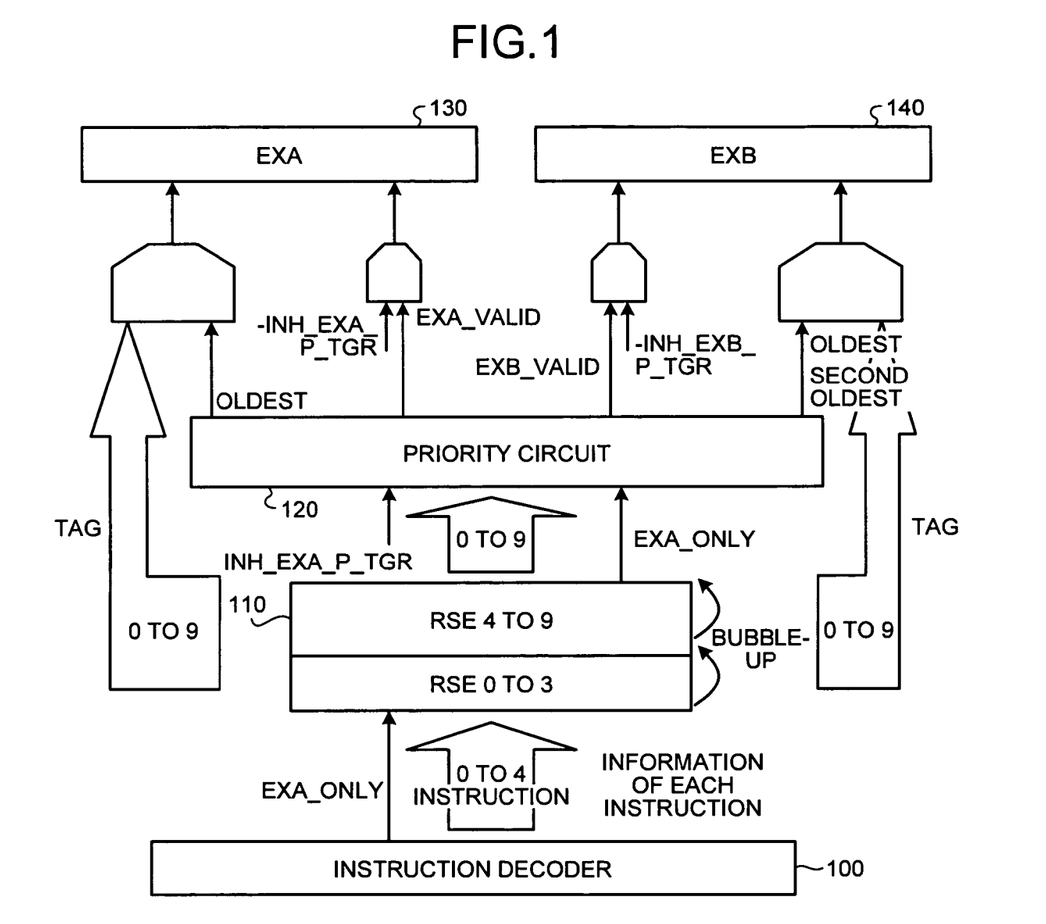
FIG. 1 is a diagram explaining an example of registration and dispatch to RSE according to the first embodiment.

First, it will be explained about registration and dispatch to RSE according to the first embodiment with reference to FIG. 1. FIG. 1 is a diagram explaining an example of registration and dispatch to RSE according to the first embodiment. Hereinafter, it will be explained about the case where four instructions can be simultaneously decoded at a maximum in order.

For example, as illustrated in FIG. 1, when Instructions 0 to 4 are simultaneously decoded in order, an instruction decoder 100 registers a flag "EXA_ONLY" indicating an instruction that can be executed by only EXA as an entry tag of RSE. Then, a shared RSE 110 performs bubble up and inputs the registered flag "EXA_ONLY" information into a priority circuit 120. Moreover, the RSE 110 inputs corresponding real data "0 to 9" according to operations that are executed by an EXA 130 and an EXB 140 into the EXA 130 and the EXB 140.

On the other hand, the priority circuit 120 determines the flag "EXA_ONLY" information and does not dispatch an entry of which the flag "EXA_ONLY" is on to the EXB 140 according to priority logic of dispatch.

Moreover, when a dispatch inhibition flag "+INH_EXA_P_TGR" depicting that the dispatch to the EXA 130 cannot be performed is on because an instruction that uses the EXA 130 is being executed, the priority circuit 120 dispatches the oldest instruction to the EXB 140 on condition that it is not "EXA_ONLY". Then, the EXA 130 and the EXB 140 execute arithmetic processing according to instructions that are dispatched in this way.

It will be explained about the dispatch to an arithmetic unit under each condition of the vacancy of RSE, the dispatch inhibition flag, the dependency relation between instructions, and the flag EXA_ONLY with reference to FIGS. 2A to 2E.

Figure 2A:
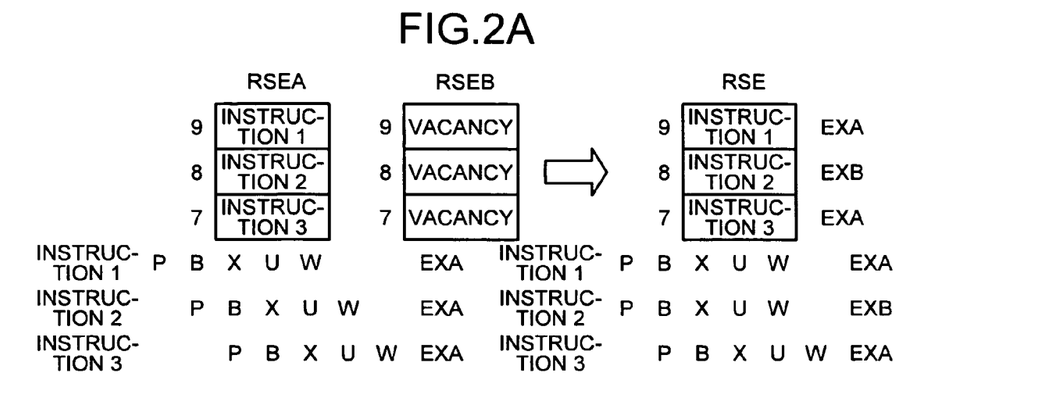
FIG. 2A is a diagram explaining an example of dispatch to an arithmetic unit when the queue of RSEB is empty.

First, it will be explained about the dispatch to an arithmetic unit when the queue of RSEB is empty with reference to FIG. 2A. FIG. 2A is a diagram explaining an example of the dispatch to an arithmetic unit when the queue of RSEB is empty.

For example, as illustrated in FIG. 2A, in a state where Instruction 1 to Instruction 3 are assigned to queues 9 to 7 of RSEA and queues 9 to 7 of RSEB are empty, Instruction 2 cannot be dispatched to EXB even if the EXB is vacant when RSE is divided into two like the conventional art. Therefore, in the present application for sharing RSE, Instruction 2 is dispatched to the EXB when the flag EXA_ONLY is not on about Instruction 2.

Figure 2B:
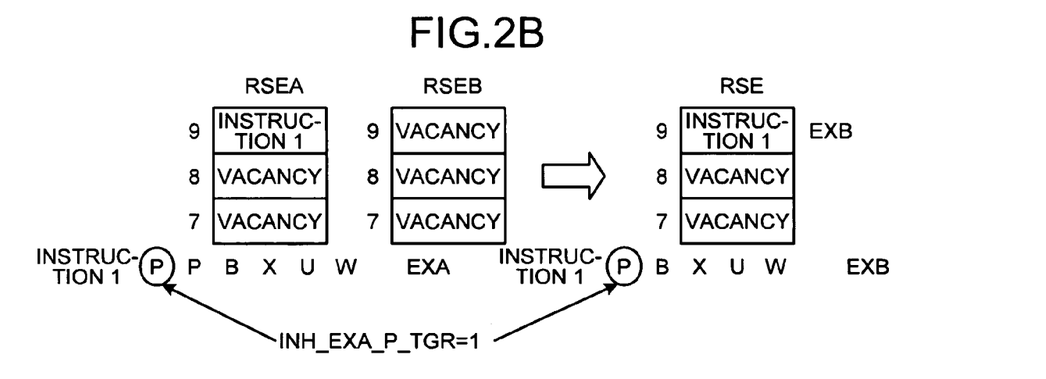

Next, it will be explained about the dispatch to the arithmetic unit when a dispatch inhibition flag is on with reference to FIG. 2B. FIG. 2B is a diagram explaining an example of the dispatch to the arithmetic unit when a dispatch inhibition flag is on.

For example, as illustrated in FIG. 2B, in the case of the dispatch inhibition flag "INH_EXA_P_TGR=1", in a state where Instruction 1 is assigned to the queue 9 of RSEA and the queues 9 to 7 of RSEB are empty, Instruction 1 cannot be issued from RSEA when RSE is divided into two like the conventional art. Therefore, in the present application for sharing RSE, Instruction 1 is dispatched to the EXB when the flag EXA_ONLY is not on about Instruction 1.

Figure 2C:
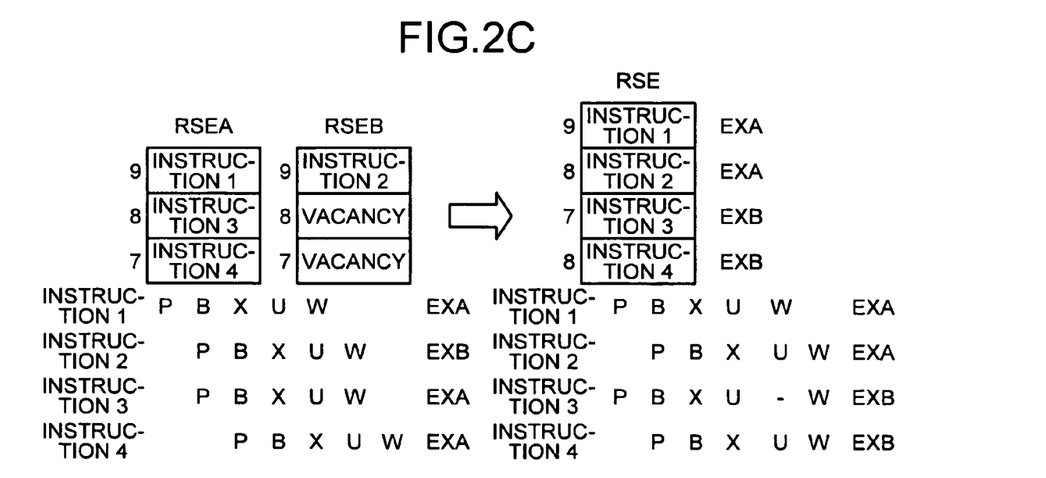
FIG. 2C is a diagram explaining an example of dispatch to the arithmetic unit when there is a dependency relation between Instruction 1 and Instruction 2.

Next, it will be explained about the dispatch to the arithmetic unit when there is a dependency relation between Instruction 1 and Instruction 2 with reference to FIG. 2C. FIG. 2C is a diagram explaining an example of the dispatch to the arithmetic unit when there is a dependency relation between Instruction 1 and Instruction 2.

For example, as illustrated in FIG. 2C, in a state where the operation result of Instruction 1 has a dependency relation with Instruction 2, Instructions 1, 3, and 4 are assigned to the queues 9 to 7 of RSEA, and Instruction 2 is assigned to the queue 9 of RSEB, Instruction 3 cannot be issued from RSEB when RSE is divided into two like the conventional art. Therefore, in the present application for sharing RSE, Instruction 2 is dispatched to the EXA and Instruction 3 and Instruction 4 are dispatched to the EXB when the flag EXA_ONLY is not on about Instruction 3 and instruction 4.

Figure 2D:
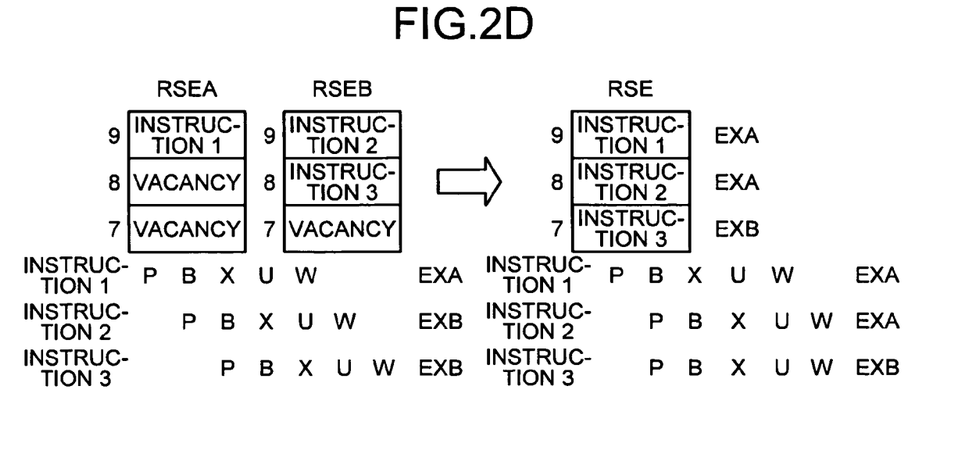
FIG. 2D is a diagram explaining an example of dispatch to the arithmetic unit when there is a dependency relation between Instruction 1, Instruction 2, and Instruction 3.

Next, it will be explained about the dispatch to the arithmetic unit when there is a dependency relation between Instruction 1, Instruction 2, and Instruction 3 with reference to FIG. 2D. FIG. 2D is a diagram explaining an example of the dispatch to the arithmetic unit when there is a dependency relation between Instruction 1, Instruction 2, and Instruction 3.

For example, as illustrated in FIG. 2D, in a state where the operation result of Instruction 1 has a dependency relation with both of Instruction 2 and Instruction 3, Instruction 1 is assigned to the queue 9 of RSEA, and Instruction 2 and Instruction 3 are assigned to the queues 9 and 8 of RSEB, Instruction 2 is dispatched in the next cycle of Instruction 1 and Instruction 3 is dispatched in the next cycle of Instruction 2 when RSE is divided into two like the conventional art. Therefore, in the present application for sharing RSE, when the flag EXA_ONLY is not on about Instruction 2 and Instruction 3, Instruction 2 is dispatched to EXA and Instruction 3 is dispatched to EXB at the same time in the next cycle of the cycle in which Instruction 1 is dispatched.

Figure 2E:
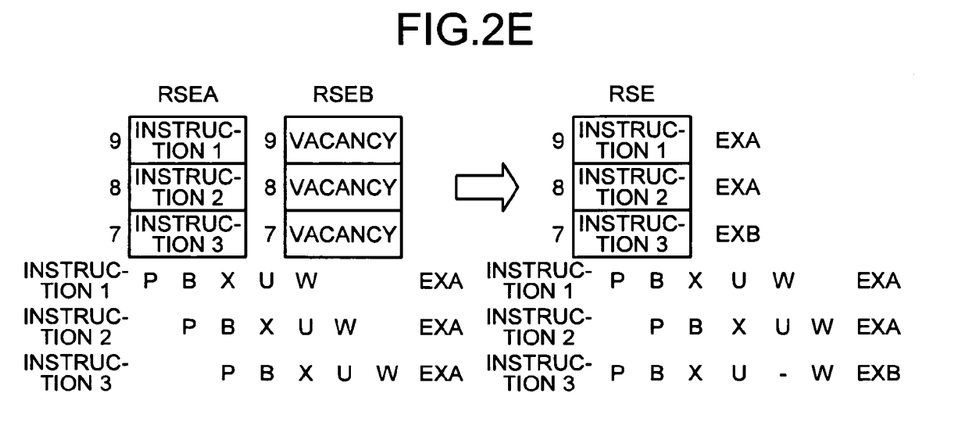
FIG. 2E is a diagram explaining an example of dispatch to the arithmetic unit when Instruction 1 and Instruction 2 are EXA_ONLY.

Next, it will be explained about the dispatch to the arithmetic unit when Instruction 1 and Instruction 2 are EXA_ONLY with reference to FIG. 2E. FIG. 2E is a diagram explaining an example of the dispatch to the arithmetic unit when Instruction 1 and Instruction 2 are EXA_ONLY.

For example, as illustrated in FIG. 2E, in a state where Instruction 1 and Instruction 2 are EXA_ONLY, Instructions 1 to 3 are respectively assigned to the queues 9 to 7 of RSEA, and the queue of RSEB is empty, Instruction 1 and Instruction 2 that are EXA_ONLY are clogged up and thus the following Instruction 3 that is not EXA_ONLY is not dispatched to the EXB when RSE is divided into two like the conventional art. Therefore, in the present application for sharing RSE, Instruction 3 is dispatched to the EXB when the flag EXA_ONLY is not on about Instruction 3.

In brief, the priority circuit according to the first embodiment dispatches an instruction to an arithmetic unit by sharing RSE on the basis of the dependency relation of instructions to be dispatched to the arithmetic unit, the flag EXA_ONLY, or the dispatch inhibition flag. In other words, because the priority circuit dispatches an instruction to an arithmetic unit on the basis of the dependency relation of instructions or various types of flags, the efficiency of arithmetic processing can be promoted without errors in arithmetic processing.

Figure 3:
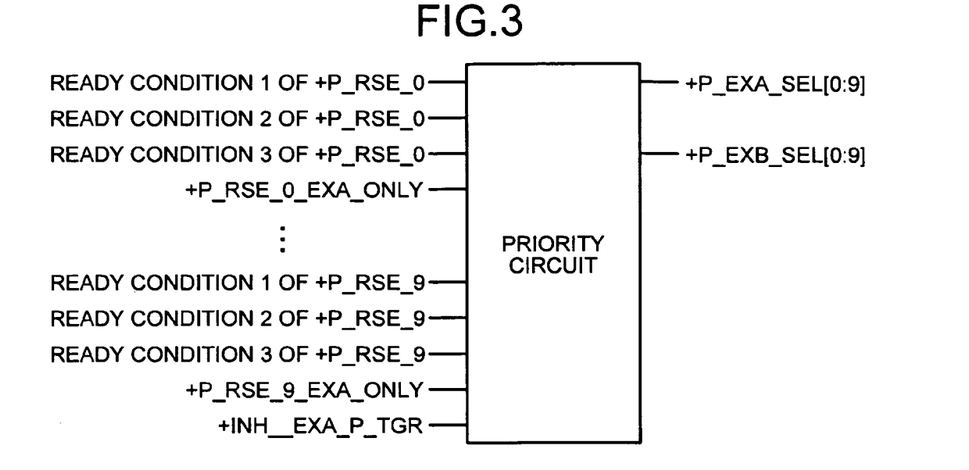
FIG. 3 is a diagram explaining the functional block of a priority circuit of RSE according to the first embodiment.

Next, it will be explained about the functional block of the priority circuit of RSE with reference to FIG. 3. FIG. 3 is a diagram explaining the functional block of the priority circuit of RSE according to the first embodiment.

For example, as illustrated in FIG. 3, the priority circuit inputs READY conditions of nine instructions "+P_RSE_0" to "+P_RSE_9" that function as an entry, flags "+P_RSE_0_EXA_ONLY" to "+P_RSE_9_EXA_ONLY" depicting whether an instruction is EXA_ONLY, and a dispatch inhibition flag "+INH_EXA_P_TGR", and sets one bit of a signal "+P_EXA_SEL[0:9]" or "+P_EXB_SEL[0:9]" for selecting an entry to be dispatched to EXA or EXB to "1".

In brief, the priority circuit depicted in FIG. 3 adds, to a priority condition according to the conventional art, a flag depicting that an instruction can be executed by only the EXA and a dispatch inhibition flag depicting that an instruction cannot be dispatched to EXA because an instruction that uses the EXA is being executed over multiple cycles. Moreover, an output by the priority circuit is a signal for selecting an entry to be dispatched to the EXA or the EXB. In this case, because the READY condition of each entry is similar to the conventional art, their descriptions are omitted.

Figure 4:
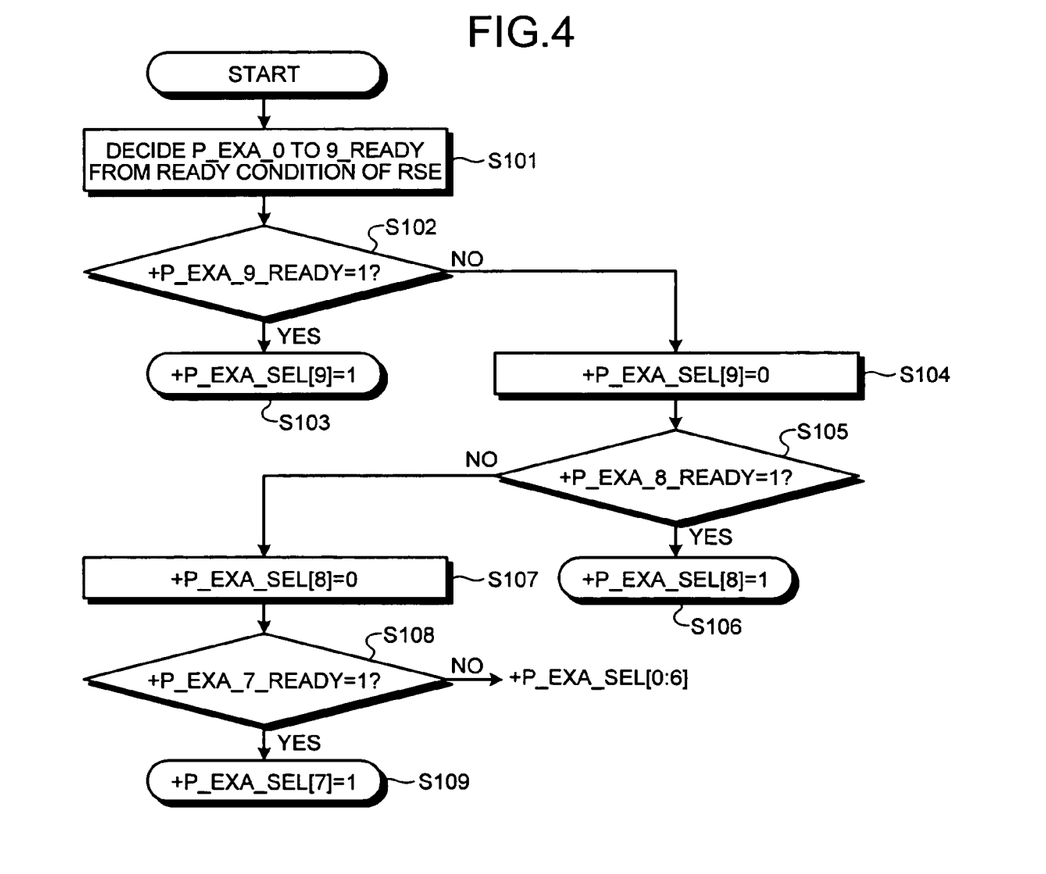
FIG. 4 is a diagram explaining a flow of EXA_SEL performed by the priority circuit.

Next, it will be explained about a flow of EXA_SEL performed by the priority circuit with reference to FIG. 4. FIG. 4 is a diagram explaining a flow of EXA_SEL performed by the priority circuit.

For example, as illustrated in FIG. 4, the priority circuit decides the READY condition of "P_EXA_0" to "P_EXA_9" from the READY condition of RSE (Step S101). Then, the priority circuit determines whether Condition 1 to Condition 3 are satisfied as the READY condition of "P_EXA_9" (Step S102).

Next, when all the three conditions are satisfied (Step S102: YES), the priority circuit selects the queue "9" "+P_EXA_SEL[9]=1" as an instruction to be dispatched to the arithmetic unit EXA (Step S103).

On the other hand, when the three conditions are not satisfied (Step S102: NO), the priority circuit does not select the queue "9" "+P_EXA_SEL[9]=0" (Step S104). Then, the priority circuit determines whether Condition 1 to Condition 3 are satisfied as the READY condition of "P_EXA_8" (Step S105). Next, when all the three conditions are satisfied (Step S105: YES), the priority circuit selects the queue "8" "+P_EXA_SEL[8]=1" as an instruction to be dispatched to the arithmetic unit EXA (Step S106).

On the other hand, when the three conditions are not satisfied (Step S105: NO), the priority circuit does not select the queue "8" "+P_EXA_SEL[8]=0" (Step S107). Then, the priority circuit determines whether Condition 1 to Condition 3 are satisfied as the READY condition of "P_EXA_7" (Step S108).

Next, when all the three conditions are satisfied (Step S108: YES), the priority circuit selects the queue "7" "+P_EXA_SEL[7]=1" as an instruction to be dispatched to the arithmetic unit EXA (Step S109). On the other hand, when the three conditions are not satisfied (Step S108: NO), the priority circuit performs the same process on the queues "0 to 6".

Figure 5:
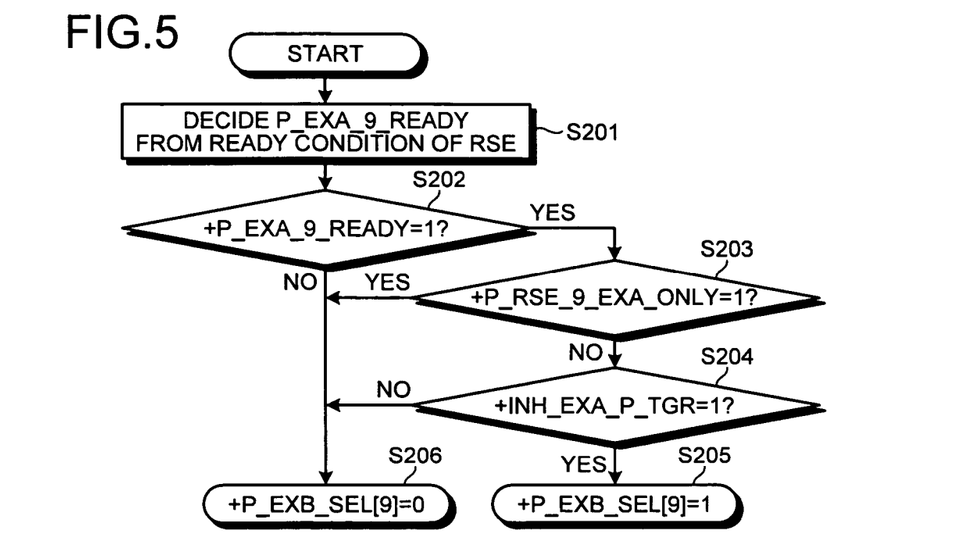
FIG. 5 is a diagram explaining a flow of EXB_SEL[9] performed by the priority circuit.

Next, it will be explained about a flow of EXB_SEL[9] performed by the priority circuit with reference to FIG. 5. FIG. 5 is a diagram explaining a flow of EXB_SEL[9] performed by the priority circuit.

For example, as illustrated in FIG. 5, the priority circuit decides the READY condition of "P_EXA_9" from the READY condition of the RSE (Step S201). Then, the priority circuit determines whether Condition 1 to Condition 3 are satisfied as the READY condition of "P_EXA_9" (Step S202).

Next, when all the three conditions are satisfied (Step S202: YES), the priority circuit determines whether the flag EXA_ONLY is on (Step S203). After that, when the flag EXA_ONLY is not on, in other words, it is not "+P_RSE_9_EXA_ONLY=1" (Step S203: NO), the priority circuit determines whether a dispatch inhibition flag is on (Step S204).

Then, when the dispatch inhibition flag is on, in other words, it is "+INH_EXA_P_TGR=1" (Step S204: YES), the priority circuit selects the queue 9 "+P_EXB_SEL[9]=1" as an instruction to be dispatched to the arithmetic unit EXB (Step S205).

When three conditions are not satisfied (Step S202: NO), when it is "+P_RSE_9_EXA_ONLY=1" (Step S203: YES), or when it is not "+INH_EXA_P_TGR=1" (Step S204: NO), the priority circuit selects not to dispatch an instruction to the arithmetic unit EXB "+P_EXB_SEL[9]=0" (Step S206).

Figure 6:
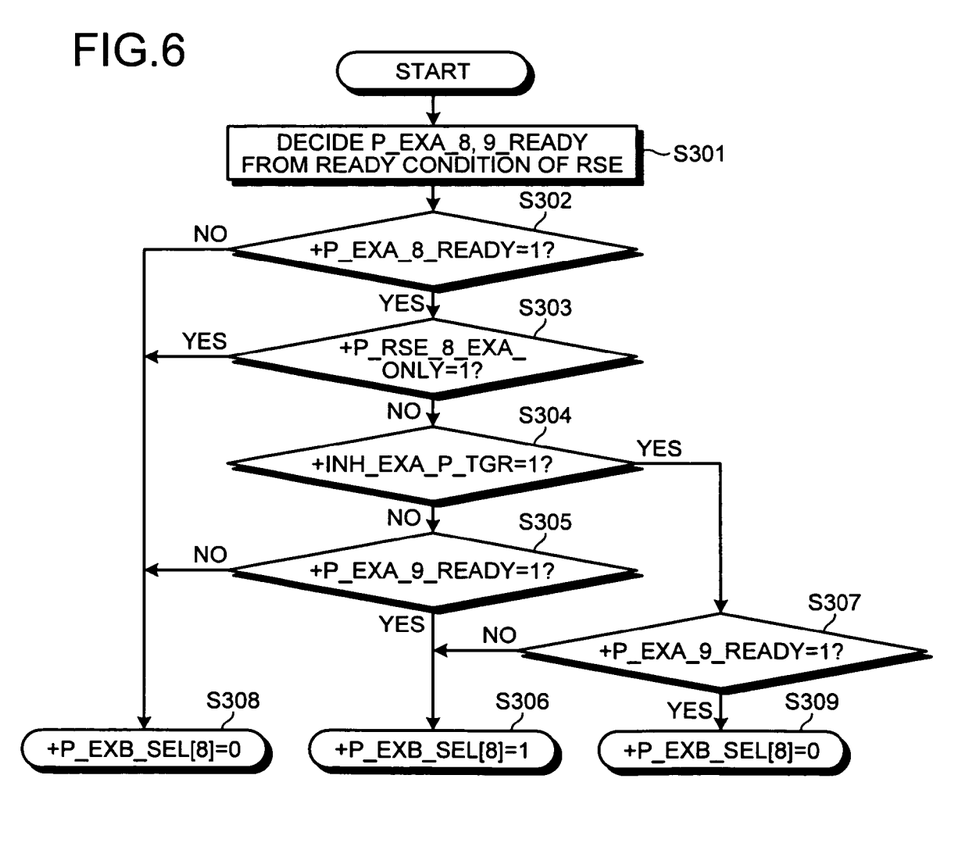
FIG. 6 is a diagram explaining a flow of EXB_SEL[8] performed by the priority circuit.

Next, it will be explained about a flow of EXB_SEL[8] performed by the priority circuit with reference to FIG. 6. FIG. 6 is a diagram explaining a flow of EXB_SEL[8] performed by the priority circuit.

For example, as illustrated in FIG. 6, the priority circuit decides the READY conditions of "P_EXA_9" and "P_EXA_8" from the READY condition of RSE (Step S301). Then, the priority circuit determines whether Condition 1 to Condition 3 are satisfied as the READY condition of "P_EXA_8" (Step S302).

Next, when all the three conditions are satisfied (Step S302: YES), the priority circuit determines whether the flag EXA_ONLY is on (Step S303). After that, when the flag EXA_ONLY is not on, in other words, it is not "+P_RSE_8_EXA_ONLY=1" (Step S303: NO), the priority circuit determines whether the dispatch inhibition flag is on (Step S304).

Then, when the dispatch inhibition flag is not on, in other words, it is not "+INH_EXA_P_TGR=1" (Step S304: NO), the priority circuit determines whether Condition 1 to Condition 3 are satisfied as the READY condition of "P_EXA_9" (Step S305).

Next, when all the three conditions are satisfied, in other words, it is "+P_EXA_9_READY=1" (Step S305: YES), the priority circuit selects the queue 8 "+P_EXB_SEL[8]=1" as an instruction to be dispatched to the arithmetic unit EXB (Step S306).

On the other hand, when the dispatch inhibition flag is on, in other words, it is "+INH_EXA_P_TGR=1" (Step S304: YES), the priority circuit determines whether Condition 1 to Condition 3 are satisfied as the READY condition of "P_EXA_9" (Step S307). Then, when all the three conditions are satisfied, in other words, it is "+P_EXA_9_READY=1" (Step S307: YES), the priority circuit selects not to dispatch the queue 8 to the arithmetic unit EXB "+P_EXB_SEL[8]=0" (Step S309). On the other hand, at Step S307, when three conditions are not satisfied, in other words, it is not "+P_EXA_9_READY=1" (Step S307: NO), the priority circuit selects the queue 8 "+P_EXB_SEL[8]=1" as an instruction to be dispatched to the arithmetic unit EXB (Step S306).

Moreover, when three conditions are not satisfied at Step S302 (Step S302: NO), when it is "+P_RSE_8_EXA_ONLY=1" at Step S303 (Step S303: YES), or when it is not "+P_EXA_9_READY=1" at Step S305 (Step S305: NO), the priority circuit selects not to dispatch the queue 8 to the arithmetic unit EXB "+P_EXB_SEL[8]=0" (Step S308).

In brief, entries after "+P_EXB_SEL[8]" are selected in accordance with the READY conditions of all the preceding entries. It should be noted that the flows to EXA and EXB in FIGS. 4 to 6 are simultaneously executed.

Figure 7:
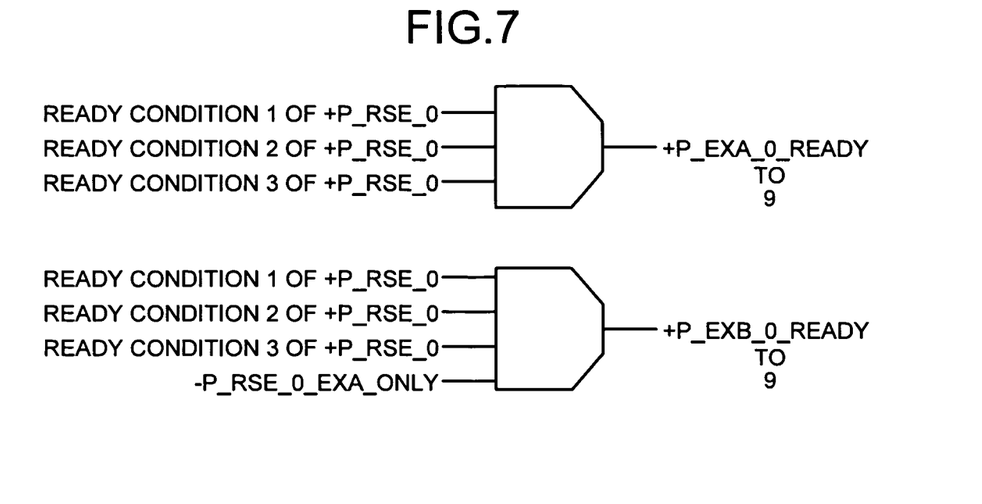
FIG. 7 is a diagram illustrating the details of the priority circuit of RSE.

Moreover, as illustrated in FIG. 7, the priority circuit related to the input of three conditions does not dispatch an instruction that can be executed by only EXA to EXB by including, for example, "−P_RSE_$_0$(0 to 9)_EXA_ONLY" in a logic for deciding the READY status of an entry of each EXA. FIG. 7 is a diagram illustrating the details of the priority circuit of RSE.

Figure 8:
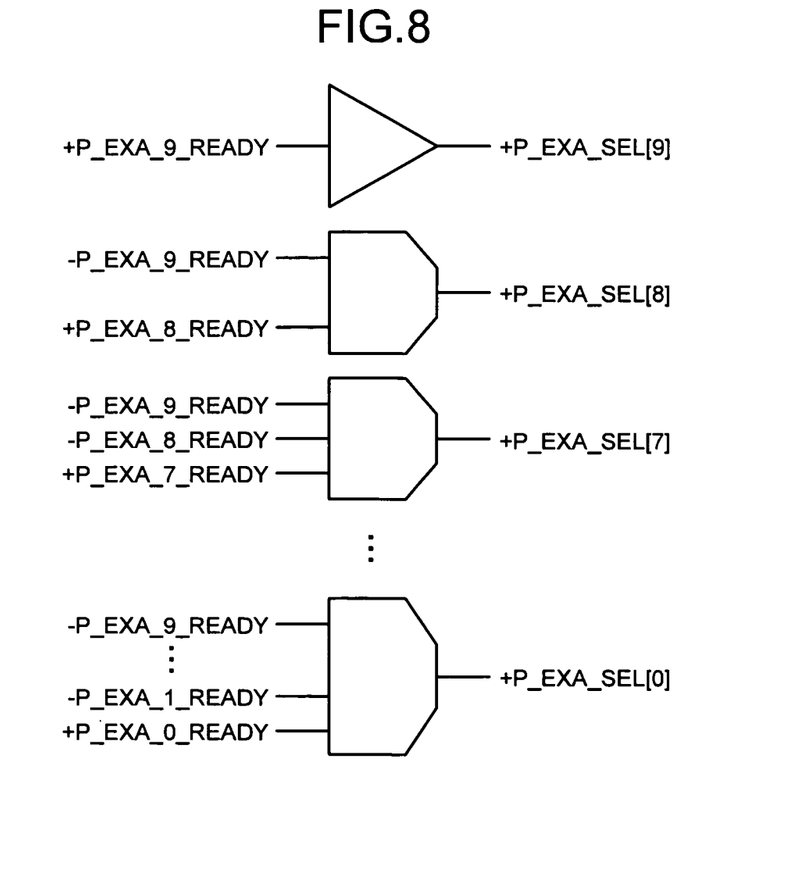
FIG. 8 is a diagram illustrating an example of an EXA selection logic unit of the priority circuit of RSE.

Next, it will be explained about an EXA selection logic unit of the priority circuit of RSE with reference to FIG. 8. FIG. 8 is a diagram illustrating an example of an EXA selection logic unit of the priority circuit of RSE.

For example, as illustrated in FIG. 8, the EXA selection logic unit of the priority circuit of RSE in the flow selects "9" if it is "+P_EXA_9_READY" and selects "8" if it is "+P_EXA_8_READY" in a state where "9" is not selected "−P_EXA_9_READY".

Moreover, for example, the EXA selection logic unit selects "7" in the case of "−P_EXA_9_READY", "−P_EXA_8_READY", and "+P_EXA_7_READY". In this way, the EXA selection logic unit selects "0" if it is "+P_EXA_0_READY" in the case of "−P_EXA_9_READY" to "−P_EXA_1_READY".

Figure 9:
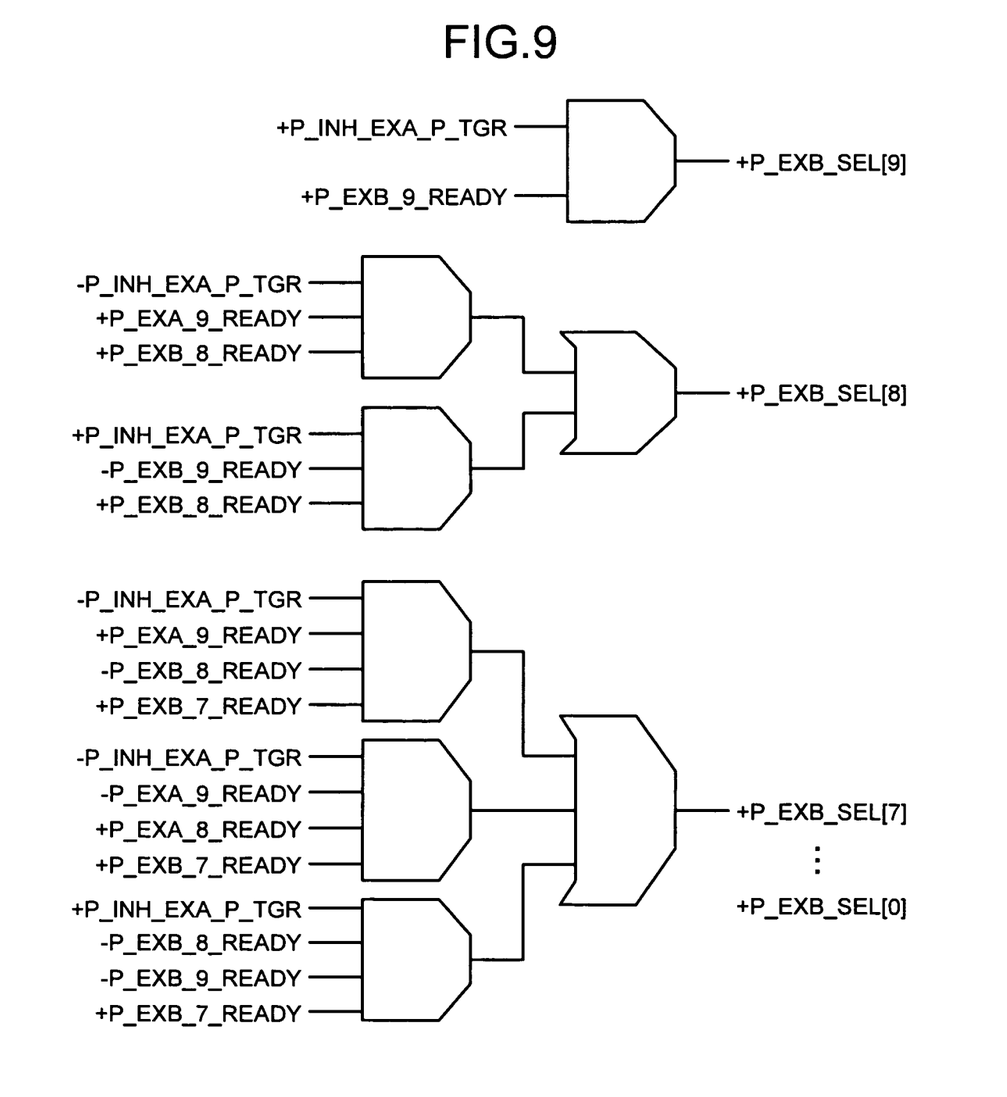
FIG. 9 is a diagram illustrating an example of an EXB selection logic unit of the priority circuit of RSE.

Next, it will be explained about an EXB selection logic unit of the priority circuit of RSE with reference to FIG. 9. FIG. 9 is a diagram illustrating an example of an EXB selection logic unit of the priority circuit of RSE.

For example, as illustrated in FIG. 9, the EXB selection logic unit of the priority circuit of RSE in the flow dispatches a second oldest ready entry to the EXB on the basis of the READY signals of EXA and EXB. However, when the dispatch inhibition flag "+INH_EXA_P_TGR" is "1", the EXB selection logic unit dispatches an oldest ready entry to the EXB. At this time, because "EXA_VALID" becomes "0" due to "−INH_EXA_P_TGR" though an oldest ready entry is dispatched to the EXA, it leads to inhibit an operation in the EXA and thus the operation is not executed.

Effect by First Embodiment

As described above, the instruction decoder inputs EXA_ONLY indicating that an instruction can be executed by only an arithmetic unit A into one reservation station and the priority circuit dispatches an instruction to an arithmetic unit B if the queue of the arithmetic unit B is vacant when it is determined that the EXA_ONLY is on in accordance with the input of the EXA_ONLY performed by the reservation station. Therefore, it is possible to improve the efficiency of arithmetic processing performed by an arithmetic unit without errors.

Moreover, when the oldest instruction is being executed by the arithmetic unit A in multiple cycles, the priority circuit dispatches an instruction to the arithmetic unit B if the dispatch inhibition flag is on and the queue of the arithmetic unit B is vacant. Therefore, it is possible to promote the efficiency of arithmetic processing performed by an arithmetic unit.

[b] Second Embodiment

It has been explained about the embodiment of the priority circuit disclosed in the present application till now. However, the present invention may be performed by various different configurations in addition to the embodiment described above. Therefore, it will be explained about a different embodiment in terms of (1) an arithmetic processing unit, (2) a floating point arithmetic unit, and (3) the configuration of a priority circuit.

(1) Arithmetic Processing Unit

In the first embodiment, it has been mainly explained about the preferred embodiment of the priority circuit. However, the present invention can be realized by an arithmetic processing unit (processor) that includes the priority circuit. For example, the priority circuit may be applied to the processor illustrated in FIG. 10.

(2) Floating Point Arithmetic Unit

Moreover, in the first embodiment, it has been explained about the case where an arithmetic unit is applied to a fixed point arithmetic unit. However, the arithmetic unit may be applied to a floating point arithmetic unit.

(3) Configuration of Priority Circuit

Moreover, processing procedures, control procedures, concrete titles, and information including various types of data and parameters (for example, the concrete title of "dispatch inhibition flag" and the like), which are described in the document and the drawings, can be arbitrarily changed except that they are specially mentioned.

Moreover, each component of each circuit illustrated in the drawings is a functional concept. Therefore, these components are not necessarily constituted physically as illustrated in the drawings. In other words, the specific configuration of dispersion/integration of each circuit is not limited to the illustrated configuration. Therefore, all or a part of each circuit can dispersed or integrated functionally or physically in an optional unit in accordance with various types of loads or operating conditions.

As described above, according to an aspect of the present invention, it is possible to improve the efficiency of arithmetic processing performed by an arithmetic unit without errors.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A priority circuit that is connected to a reservation station that includes a plurality of entries therein and supplies a decoded instruction decoded by an instruction decoder to be operated and executable information outputted from the instruction decoder indicating that a corresponding decoded instruction can be executed only by a specific arithmetic unit of a plurality of arithmetic units or the corresponding decoded instruction can be executed not only by the specific arithmetic unit but by an arithmetic unit different from the specific arithmetic unit of the plurality of arithmetic units, the decoded instruction and corresponding executable information are held in each of the plurality of entries, and the plurality of arithmetic units each have an instruction queue storing the decoded instruction supplied from the reservation station and each execute a different operation based on the decoded instruction stored in the instruction queue, the priority circuit comprising:

a dispatching unit that dispatches the decoded instruction to the specific arithmetic unit when the corresponding executable information indicates that the decoded instruction can be executed only by the specific arithmetic unit and dispatches the decoded instruction to an arithmetic unit different from the specific arithmetic unit when the corresponding executable information indicates that the decoded instruction can be executed not only by the specific arithmetic unit but by the arithmetic unit different from the specific arithmetic unit and of which an instruction queue is vacant.

2. The priority circuit according to claim 1, wherein
the dispatching unit dispatches the decoded instruction to an arithmetic unit different from the specific arithmetic unit when corresponding dispatch inhibition information indicates that the decoded instruction cannot be dispatched to a specific arithmetic unit and of which a queue is vacant.

3. A processor comprising:
a reservation station that includes a plurality of entries therein and supplies a decoded instruction to be operated and executable information;
a plurality of arithmetic units that each have an instruction queue storing the decoded instruction supplied from the reservation station and each execute a different operation based on the decoded instruction stored in the instruction queue;
an instruction decoder that decodes and outputs the decoded instruction and the executable information indicating that an instruction can be executed only by a specific arithmetic unit or the corresponding decoded instruction can be executed not only by the specific arithmetic unit but by an arithmetic unit different from the specific arithmetic unit of the plurality of arithmetic units; and
a priority circuit that dispatches the decoded instruction to the specific arithmetic unit when the corresponding executable information indicates that the decoded instruction can be executed only by the specific arithmetic unit and dispatches the decoded instruction to an arithmetic unit that is different from the specific arithmetic unit when the corresponding executable information indicates that the decoded instruction can be executed not only by the specific arithmetic unit but by the arithmetic unit different from the specific arithmetic unit and of which an instruction queue is vacant.

4. The processor according to claim 3, wherein
the priority circuit dispatches the decoded instruction to an arithmetic unit that is different from the specific arithmetic unit when corresponding dispatch inhibition information indicates that the decoded instruction cannot be dispatched to a specific arithmetic unit and of which a queue is vacant.

5. A processing method of a processor that includes a reservation station that includes a plurality of entries therein and supplies a decoded instruction to be operated and executable information and a plurality of arithmetic units that each have an instruction queue and each execute a different operation, the processing method comprising:

outputting a decoded instruction and the executable information indicating that a corresponding decoded instruction can be executed only by a specific arithmetic unit of a plurality of arithmetic units or the corresponding decoded instruction can be executed not only by the specific arithmetic unit but by an arithmetic unit different from the specific arithmetic unit of the plurality of arithmetic units;
dispatching the decoded instruction to the specific arithmetic unit when the corresponding executable information indicates that the decoded instruction can be executed only by the specific arithmetic unit;
dispatching the decoded instruction to an arithmetic unit that is different from the specific arithmetic unit when the corresponding executable information indicates that the decoded instruction can be executed not only by the specific arithmetic unit but by the arithmetic unit different from the specific arithmetic unit and of which an instruction queue is vacant.

6. The processing method according to claim 5, wherein
the dispatching dispatches the decoded instruction to an arithmetic unit that is different from the specific arithmetic unit when corresponding dispatch inhibition information indicates that the decoded instruction cannot be dispatched to a specific arithmetic unit and of which a queue is vacant.

* * * * *